(12) United States Patent
Blagotinsek et al.

(10) Patent No.: US 9,261,175 B2
(45) Date of Patent: Feb. 16, 2016

(54) KITCHEN APPLIANCE

(75) Inventors: Andrej Blagotinsek, Slovenj Gradec (SI); Ales Brecko, Celje (SI)

(73) Assignee: BSH Hausgeraete GmbH, Munich (DE)

( * ) Notice: Subject to any disclaimer, the term of this patent is extended or adjusted under 35 U.S.C. 154(b) by 400 days.

(21) Appl. No.: 13/814,246

(22) PCT Filed: Aug. 16, 2011

(86) PCT No.: PCT/EP2011/064078
§ 371 (c)(1),
(2), (4) Date: Feb. 5, 2013

(87) PCT Pub. No.: WO2012/025430
PCT Pub. Date: Mar. 1, 2012

(65) Prior Publication Data
US 2013/0125679 A1 May 23, 2013

(30) Foreign Application Priority Data

Aug. 24, 2010 (DE) .......................... 10 2010 039 721

(51) Int. Cl.
*A47J 43/044* (2006.01)
*F16H 21/42* (2006.01)
*A47J 43/07* (2006.01)

(52) U.S. Cl.
CPC ............. *F16H 21/42* (2013.01); *A47J 43/0705* (2013.01); *Y10T 74/18232* (2015.01)

(58) Field of Classification Search
CPC .................................................... A47J 43/0705
USPC ......................................... 366/197, 207, 285
See application file for complete search history.

(56) References Cited

U.S. PATENT DOCUMENTS

| 238,393 | A | * | 3/1881 | Howson | 366/207 |
| 1,824,328 | A | * | 9/1931 | Cammann | 366/207 |
| 2,054,666 | A | * | 9/1936 | Van Guilder | 366/201 |
| 2,103,922 | A | * | 12/1937 | Van Guilder | 366/201 |
| 2,552,605 | A | * | 5/1951 | Van Guilder | 310/66 |
| 2,616,673 | A | | 11/1952 | Van Guilder | |
| 2,662,421 | A | * | 12/1953 | Van Guilder | 74/606 R |
| 3,670,923 | A | * | 6/1972 | Hawes et al. | 222/2 |

FOREIGN PATENT DOCUMENTS

WO    2008132429 A1    11/2008

OTHER PUBLICATIONS

International Search Report PCT/EP2011/064078 dated Nov. 9, 2011.
Report of Examination DE 10 2010 039 721.0 dated Jun. 8, 2011.

* cited by examiner

*Primary Examiner* — David Sorkin
(74) *Attorney, Agent, or Firm* — Laurence A. Greenberg; Werner H. Stemer; Ralph E. Locher (57) ABSTRACT

A kitchen appliance includes a base body, a pivot arm which is disposed in a pivotable manner on the base body and a lever facility for assisting a pivoting movement of the pivot arm. An adjusting mechanism is operably connected to the lever facility to set a degree of assistance for the pivoting movement.

15 Claims, 8 Drawing Sheets

KITCHEN APPLIANCE

BACKGROUND TO THE INVENTION

The present invention relates to a kitchen appliance, in particular a food processor, having a base body, a pivot arm, which is disposed in a pivotable manner on the base body, and a lever facility for assisting a pivoting movement of the pivot arm.

PRIOR ART

Food processors or universal food processors are generally electrical kitchen appliances, which are used in the known manner for kneading, mixing, shredding, pureeing or juicing. Such appliances consist of a base unit with a mixing or collecting bowl and various add-on parts, for example choppers, blender attachments, grinders or citrus presses, as well as different inserts (slicing and shredding disks, dough hooks, beaters and whisks). In order to be able to perform the functions listed above, food processors have a plurality of processing tools. The processing tools can be in the form of disks, drums or cones. Some appliances can accommodate individual dough hooks or whisks. Mixing or collecting bowls are integrated in the appliance or can be removed. In some instances specific tools are permanently incorporated. Some auxiliary appliances are complete units (mincers, citrus presses) which only use the processor drive. With electrical machines the speed can usually be regulated in a number of stages or can be regulated continuously. To connect the processing tools, food processors have at least one interface or coupling point, which is set up to connect tools to the electric drive.

Such food processors essentially have an L-shaped basic housing, having a horizontal base part. A processing bowl can be disposed on this horizontal base part, in which the desired ingredients can be processed with the aid of the tool. Such generic food processors also have an extension arm, which is hinged to the basic housing. The extension arm has a series of coupling points for the abovementioned tool. In order to be able to remove the processing bowl for example, the extension arm has a pivotable bearing point on the basic housing, so that the arm can be raised to allow the processing bowl to be removed easily. A further advantage of the pivotable bearing of the extension arm on the basic housing can allow for example the compact storage of the food processor, as the extension arm can be fixed in a vertical position. Further coupling points can also be provided in this position, for example a blender attachment or the like.

In order to control the pivoting movements of the extension arm, the appliances comprise various apparatuses on the basic housing. WO 2008/132429 A1 therefore discloses a universal food processor of the type mentioned above, having an extension arm, the movement of which is controlled with the aid of an elastic spring. The kitchen appliance also has a damping means, which counteracts the spring force, to prevent the arm swinging up in an uncontrolled manner. The damping means corresponds to a hydraulic damper and can have different degrees of damping according to WO 2008/132429 A1. Such a structure has proven inflexible and complicated, as the spring force exerts a corresponding torque on the pivot arm, corresponding to unilateral pivoting up of the arm. Also this structure cannot ensure an essentially vertical position of the pivot arm.

BRIEF SUMMARY OF THE INVENTION

The object underlying the invention is to provide an improved kitchen appliance compared with the prior art, which ensures reliable operation. The object underlying the invention is also to provide a method for producing a kitchen appliance.

Inventive solution

The stated objects are achieved by a kitchen appliance having the features of claim 1 and by a method as claimed in claim 13. The inventive kitchen appliance is based on conventional kitchen appliances in that it has a means for adjusting the lever facility, which is configured to set the degree of assistance for the pivoting movement of the pivot arm. The adjusting means allows compensation for component tolerances of the kitchen appliance and/or friction effects within the lever facility or the bearing point at which the pivot arm is supported on the base body. The kitchen appliance has a plurality of different components, which behave differently due to their manufacture. For example the bearing point can show different friction behavior as a function of the components used. The lever facility would therefore no longer be able to assist the pivoting movement of the pivot arm precisely and reliably for a user. The adjusting means ensures an equal degree of assistance despite tolerances due to manufacture and/or assembly, which could result in different functional behavior on the part of the components used.

PREFERRED EMBODIMENT OF THE INVENTION

Advantageous configurations and developments, which can be utilized individually or in combination with one another, are the subject matter of the dependent claims.

The means for adjusting the lever facility preferably comprises a control element. The control element allows user-friendly and/or production-friendly adjustment of the lever facility to be achieved. To this end the control element can have a tool interface, to which an external tool can be connected, in order that the control element can be operated correspondingly. It is however also conceivable for the control element to have a handle, which can be operated by direct interaction on the part of a user for adjustment purposes.

The control element advantageously has at least one gearwheel region, which interacts with a ratchet means. The gearwheel region, which interacts with a ratchet means, allows the control element to be secured in a desired position. By provided a plurality of teeth in the respective gearwheel regions, it is possible to achieve appropriate fine setting of the adjustment. The ratchet means can be configured for example on the base body of the kitchen appliance but a separate apparatus, which is mounted on the base body at a later stage, is also possible. The ratchet means can have a spring for example, which is pressed against the gearwheel region of the control element, in order to be able to provide the desired securing.

It is preferable for the control element to be supported on the base body of the kitchen appliance in such a manner that it can be rotated about a rotation axis. The rotatable support allows adjustment to be ensured particularly advantageously, as the control element can take up a large number of incident angles.

According to one embodiment of the present invention the control element is supported on the base body of the kitchen appliance in such a manner that it can be rotated about a rotation axis so that a full rotation about the rotation axis can be performed. If the control element can only be rotated in one direction, it can then be returned to the starting position by passing through a full 360° rotation. A second adjustment cycle can then be started.

It is preferable for the base body to have a housing, within which the control element is disposed. The exterior of the kitchen appliance is thus not influenced by the control element. The housing can have a cover, which can be removed so that the control element is then accessible to an operator or an automatic tool.

The lever facility advantageously has a force-active means, in particular an elastic spring, the control element interacting with the force-active means, in particular with the elastic spring, in an engagement region. The force-active means supplies an appropriate assisting force for the pivot arm, which can be set or finely adjusted by means of the control element according to the present invention.

According to one embodiment of the present invention the engagement region has an offset relative to the rotation axis of the control element. A rotational movement can thus be converted to a translational movement, which is used to adjust the lever facility. This means that the engagement region migrates around the rotation axis of the control element, thereby tensioning or detensioning the force-active means. The lever facility can thus be adjusted.

According to the invention the engagement region is preferably configured as an engagement shaft of the control element, which is offset from the main shaft of the control element running along the rotation axis by the offset. The offset can be used to set the degree of the translational movement, which in turn allows adjustment of the lever facility.

The control element can be formed as a single piece. The control element can therefore be produced at low cost during an injection molding procedure. It is therefore possible to minimize intended breaking points to a large extent.

The material for the control element can be reinforced and the use of glass fibers in particular has proven effective. The glass fiber material PA 6.6 GF30 has proven particularly advantageous, as it has a very high strain resistance and can therefore absorb the force of the force-active means of the lever facility.

According to a further aspect of the present invention a method for setting a pivoting movement of a kitchen appliance pivot arm is provided. To this end a means for adjusting the pivot movement is provided. The pivot behavior of the pivot arm is first detected, in particular by measuring means, and in a further step the setting of the pivoting movement is then performed using the adjusting means based on the detected parameters. The inventive method is particularly advantageously performed automatically during the final assembly of a kitchen appliance on a production line. The method can also be applied to individual parts during maintenance or directly in the case of a user of the kitchen appliance. The pivoting movement can then be detected without measuring means. To this end a user can observe the pivot behavior and adjust or set the pivoting movement as desired with the aid of the adjusting means.

The detection of the pivot behavior is advantageously provided by measuring the pivoting movement, in particular a pivot speed. The parameters thus obtained can be compared with predetermined parameters, in order then to set the adjusting means automatically.

According to the invention the method is preferably performed during final assembly of a kitchen appliance on an assembly line.

The present invention is suitable in particular for food processors or kitchen appliances, which have a pivot arm and a plurality of coupling points for processing tools. The adjusting means allows the pivoting movement of the pivot arm to be set accordingly, thereby enhancing the user-friendliness of the kitchen appliance for an end user.

BRIEF DESCRIPTION OF THE DRAWINGS

Further advantageous embodiments are described in more detail in the following based on an exemplary embodiment, to which the invention is not however restricted, as illustrated in the drawing, in which.

DETAILED DESCRIPTION OF THE EXEMPLARY EMBODIMENTS OF THE PRESENT INVENTION

In the description which follows of preferred embodiments of the present invention identical reference characters designate identical or comparable components.

Figure 1:
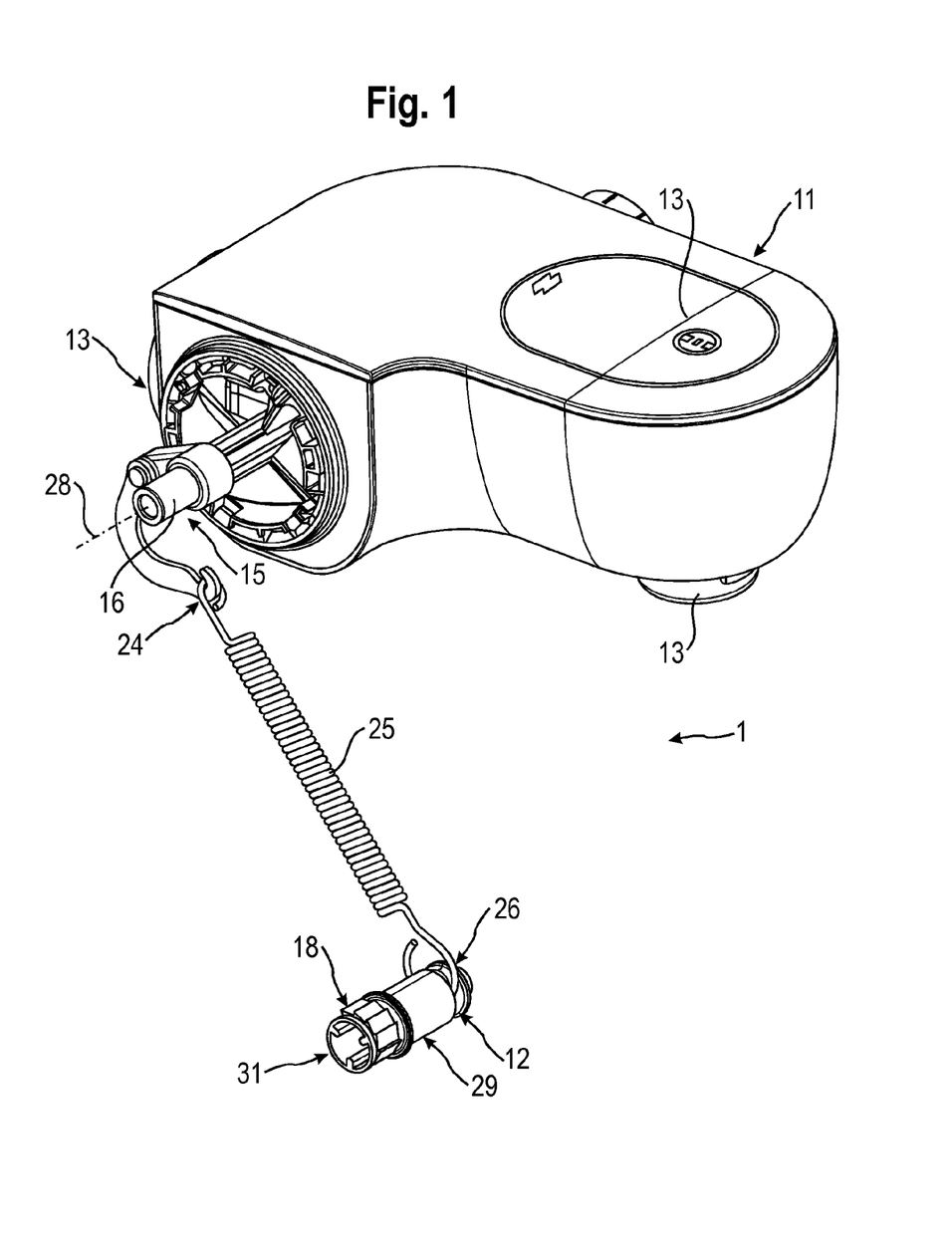
FIG. 1 shows a perspective partial view of a kitchen appliance according to the present invention.

FIG. 1 shows a partial view of a kitchen appliance, in particular an electric motor-driven kitchen appliance 1, preferably an electric motor-driven freestanding or universal food processor according to the present invention. For the sake of clarity the base body 10 has not been shown, to make the diagram of the lever facility 20 and the adjusting means 17 clearer.

The kitchen appliance 1 essentially has an L-shaped structure with a base part 14, on which a bowl (not shown) can be positioned to hold food. The kitchen appliance 1 comprises a base body 10, which is not shown in FIG. 1, and a pivot arm 11. According to this embodiment of the present invention the pivot arm 11 has a plurality of coupling points 13 for processing tools (not shown). Processing tools can refer in particular to pureeing, mixing, chopping, kneading and/or cutting tools, beaters and whisks, beverage mixers, slicers, grinders, citrus or fruit presses and/or mincers. Depending on the pivot arm position, it is possible to operate individual coupling points 13, the drive motor of the electrical kitchen appliance 1 generally being disposed in the base body 10 and its torque being transferred by way of appropriate gearing facilities to the individual coupling points 13. The coupling point 13 in the lower region, with reference to FIG. 1, of the pivot arm 11 is thus used for example to operate a mixing tool for processing dough. The coupling point 13 disposed on the side of the pivot arm 11 can be used to connect a mincer but it is also possible to employ further processing tools.

The pivot arm 11 interacts with the base body 10 of the kitchen appliance at a bearing point 15. The bearing point 15 is configured so that the pivot arm 11 can take up different operating positions. FIG. 1 shows a first operating position, in which the pivot arm 11 is fixed horizontally, in order to be able to process dough for example in a mixing bowl below the coupling point 13. In this operating position the pivot arm axis 11 runs essentially horizontally. The bearing point 15 has a bearing pin 16, which defines a bearing axis 28. The pivot arm 11 is coupled in an appropriate manner on this bearing pin 16, so that a simple pivoting movement can be ensured. The arm 11 therefore pivots essentially between two end positions, namely the position in which the pivot arm axis runs parallel to the base body and a further position in which the pivot arm axis corresponds to the extension of the base body axis. The continuous bearing of the pivot arm 11 at the bearing point 15 means that different intermediate positions can be set.

According to this embodiment the lever facility 20, which is coupled to the bearing point 15, has a first lever 21 and a second lever 22. The second lever 22 interacts with an elastic spring 25 in a second articulation 24. According to the present invention the elastic spring 25 is actively connected to the base body 10 by way of a means 17 for adjusting the pivoting movement.

The base body 10 provides a fixed holding point for the spring 25, so that the lever facility 20 can convert the spring force to assist the pivot arm 11. The first and second levers 21, 22 interact correspondingly in an articulation 23, which transfers the spring force acting on the second lever 22 to the first lever 21. According to this embodiment the first lever 21 is disposed on the bearing axis 28 of the bearing point 15 and transfers the torque to the pivot arm 11. The first lever 21 is disposed on the bearing point 15 in such a manner that it pivots with the pivot arm 11 and can convert the spring force to a torque, which assists the arm 11. The spring 25, which interacts with the second lever 22 in a second articulation 24, has a tensioned state (i.e. the spring is tensioned). The elastic spring 25 therefore pulls on the second lever 22 with a defined force. This force is transferred on by way of the first articulation 21 to the first lever 21. The first lever is disposed in a torsionally resistant manner on the bearing axis 28 and therefore a torque produced by the spring force acts on the bearing axis 28 or on the bearing pin 16. As the bearing axis 28 is connected to the pivot arm 11, this torque therefore also acts on the pivot arm 11. So that the arm 11 cannot be pivoted out of this operating position, the kitchen appliance has a securing means (not shown) or fixing facility for the pivot arm. The securing means therefore equalizes the torque and the kitchen appliance 1 can be operated safely in this operating position. The first lever 21 is disposed on the bearing axis 28 in such a manner that it can pivot synchronously with the pivot arm 11. When the securing means described above has been released, the spring force pulls on the first lever 21 by way of the second lever 22. The first lever 21 therefore exerts a torque on the pivot arm 11, which causes the pivot arm to swing or pivot up. The dimensions of the lever mean that different torques can be set, which can be matched to the inherent weight of the pivot arm 11.

According to one possible embodiment the securing means for the pivot arm 11 can be operated for example by means of an operating button (not shown) disposed on the pivot arm 11 or said operating button can optionally be disposed at a suitable point on the base body 10. Actuation of the operating button by a user allows the pivot arm 11 to move freely once again, so that the torque exerted by the spring force can act on the pivot arm 11. According to this arrangement the torque would cause the pivot arm to swing up, in other words the pivot arm 11 moves upward away from the base body 10. In the raised state the bowl can be accessed more easily and ingredients such as food and the like can be introduced. It is also easier and more convenient to change the processing tool in the coupling point 13.

According to one embodiment of the present invention the force-active means, in particular the elastic spring 25, interacts with the control element 12 as an adjusting means in an engagement region 26. The control element is supported rotatably on the base body 10 and is set up to be able to set or adjust the pretensioning of the spring 25. The engagement region 26 of the control element can be adjusted essentially vertically by rotating the control element, which in turn pretensions the spring 25. However if the pretensioning of the spring exceeds a desired value for example, the pretensioning can be correspondingly reduced at the control element. The control element 12 on the base body 10 is supported rotatably in such a manner that a full 360° rotation can be performed. The control element also has a tool interface 31, which interacts for example with a work tool, in order to simplify adjustment by a user. The control element 12 can thus be rotated or adjusted by means of the work tool. The work tool can also be part of a production line, so that adjustment can take place automatically for example on a conveyor belt of the production line. To this end the pivoting movement of the pivot arm 11 is detected by tests and the control element 12 can be adjusted automatically if required to the desired pretensioning. This is a significant advantage when producing the kitchen appliance, as there is then largely no need for further function tests.

Figure 2:
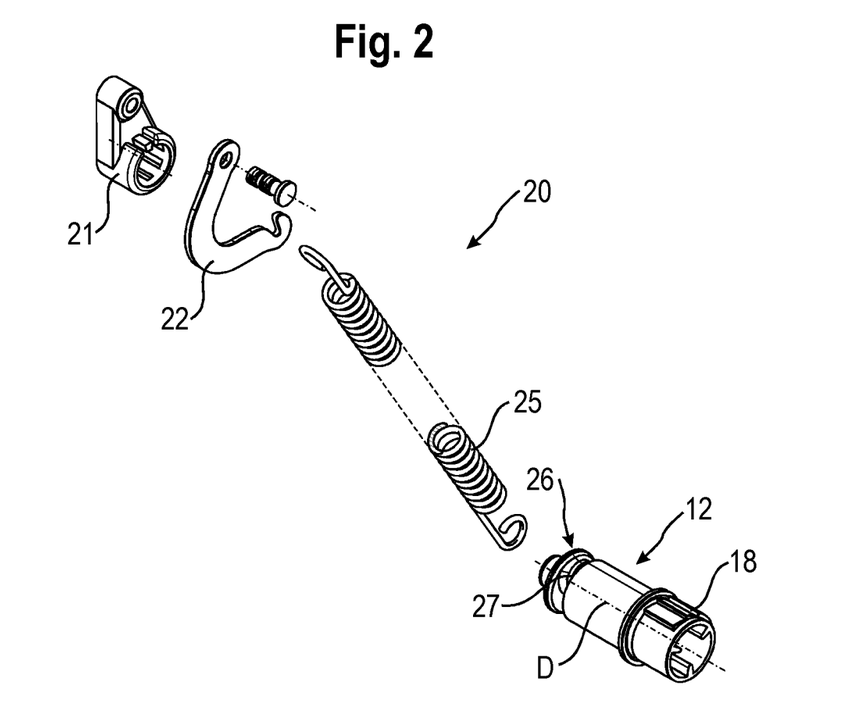
FIG. 2 shows an exploded view of a lever facility and the adjusting means according to the present invention.

FIG. 2 shows an exploded view of the lever facility and the control element according to the present invention. The control element 12 has a gearwheel region, which interacts with corresponding countermeans on the base body 10 or on the base body housing 30. The control element 12 can thus be secured against rotation in a defined position. The engagement region 26 has an engagement shaft 27, which is configured eccentrically in respect of the main rotation axis D, or the main shaft 29 of the control element 12. The eccentric arrangement of the shaft 27 allows the tension of the spring 25 to be set simply by rotating the control element 12, the control element 12 maintaining its position relative to the base body 10.

Figure 3:
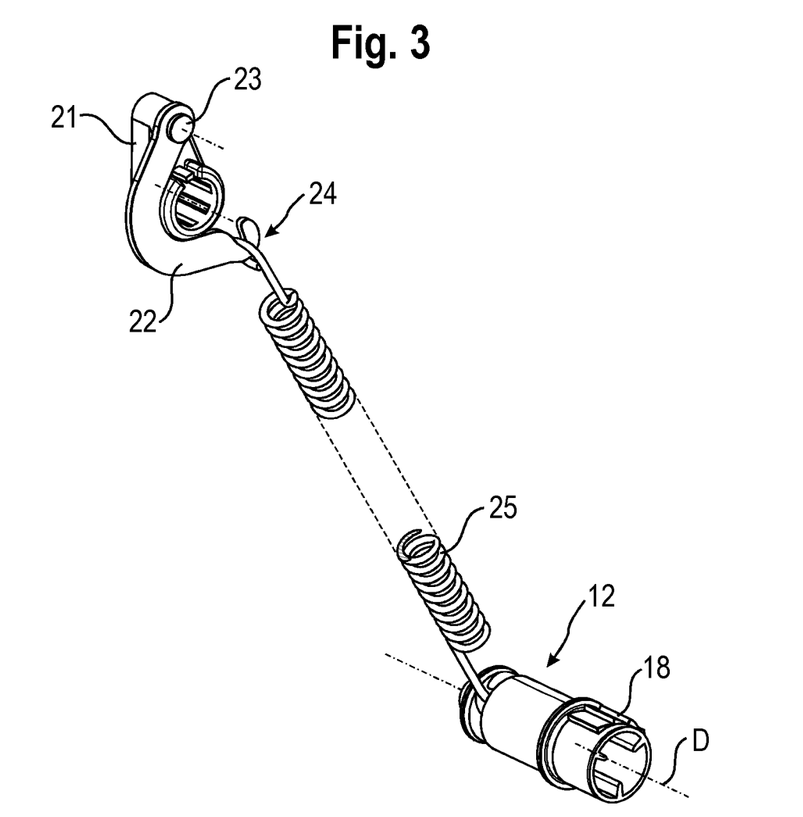
FIG. 3 shows a perspective view of the lever facility and the adjusting means in the assembled state according to the present invention.

FIG. 3 corresponds to the diagram in FIG. 2, with the individual components only connected functionally to one another. The first lever 21 and the second lever 22 of the lever facility 20 interact in a rotational articulation 23. Configured in the lower region 24 of the second lever is a tab to which a spring 25 is fastened according to one possible embodiment. The spring force can thus assist the pivot arm movement by way of the first and second levers 21, 22. Provided in the base body 10, as mentioned above, is the control element 12, which can be used as an adjusting means for the spring tension. The control element is supported on the base body in such a manner that it can be rotated about the axis D and it can be rotated fully about the axis D. The eccentric structure means that the spring tension can be increased to a maximum point during the first half-circle movement or rotation, with the spring tension decreasing again with further movement. The gearwheel region 18 on the control element allows this latter to be secured in the desired position.

Figure 4:
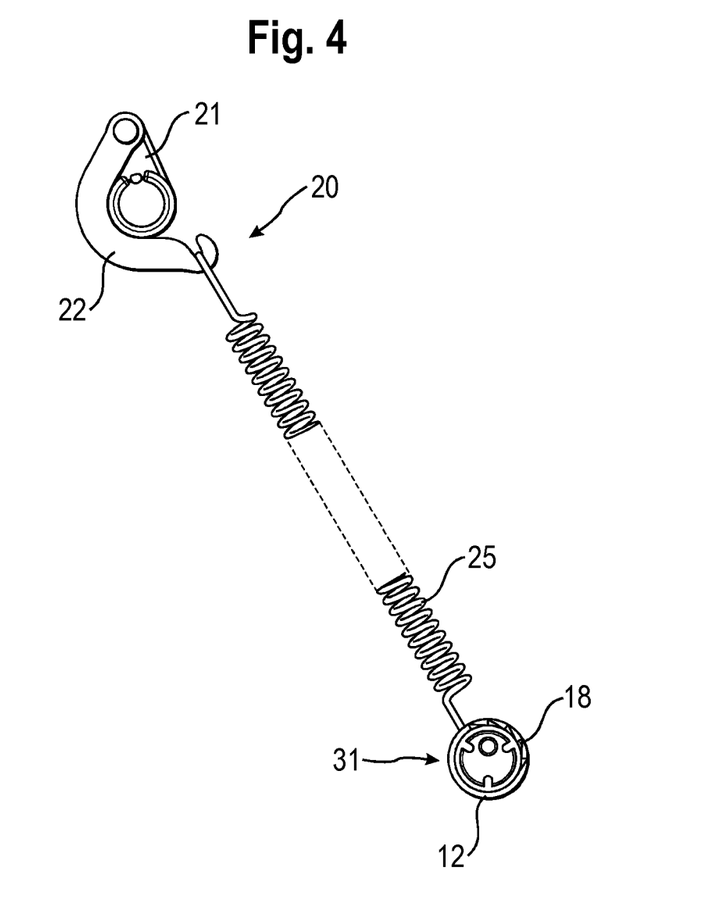
FIG. 4 shows a front view of the apparatus according to FIG. 2.

FIG. 4 corresponds to the front view of FIG. 3. The tool interface 31 according to one possible embodiment can interact with a tool, so that the control element 12 can be made to rotate. The gearwheel region 18 comprises five teeth by way of example, which latch correspondingly with the base body, in order thus to provide five possible incident angles for the control element 12.

Figure 5:
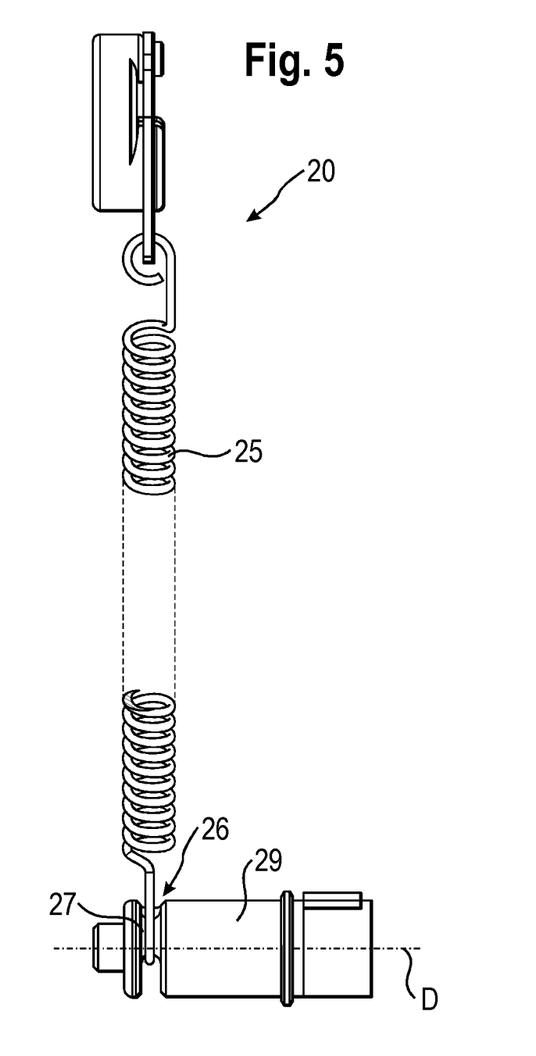
FIG. 5 shows a side view of the apparatus according to FIG. 2.

FIG. 5 corresponds to a side view of the apparatus according to FIG. 2. The control element 12 has a main shaft 29 and an engagement shaft 27, which interacts essentially with the elastic spring 25. The axis of the engagement shaft 27 is offset relative to the main rotation axis D of the control element 12, which corresponds to an eccentric structure. It is thus possible to set the spring tension correspondingly, as the engagement region 26 of the axis 27 is located either above or below the axis D depending on the incident angle W of the control element 12.

Figure 6:
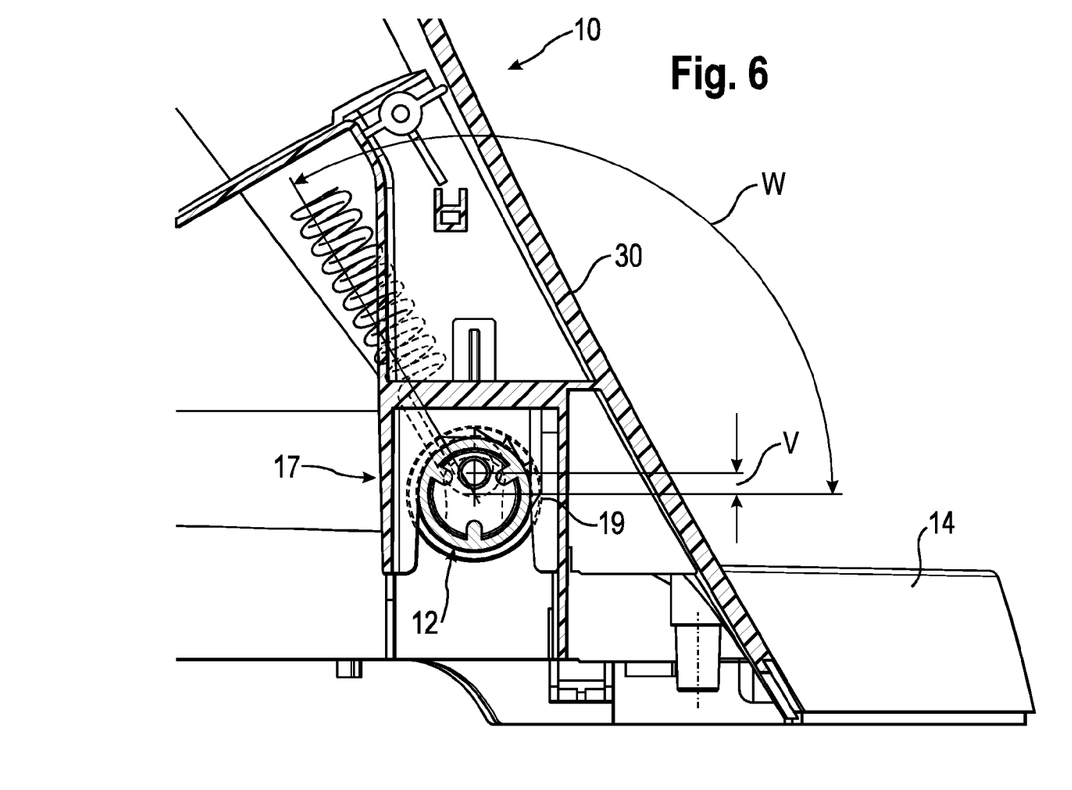
FIG. 6 shows a side view of the control element disposed on the base body according to the present invention.

FIG. 6 shows a side view of the control element 12 disposed on the base body 10 according to the present invention. The control element 12 interacts with the gearwheel region 18 with a corresponding ratchet means 19 on the base body. The ratchet means 19 is embodied in such a manner that the control element is secured or locked in a desired position and backward rotation of the control element 12 can be avoided. The ratchet means 19 can be configured for example as a single piece with the housing 30 of the base body but an additional apparatus, which is fixed to the base body 10, can also be used. According to this embodiment the control element 12 can take up five positions, corresponding to incident angle W to the horizontal. The horizontal is defined by the base part 14 of the kitchen appliance.

Figure 7:
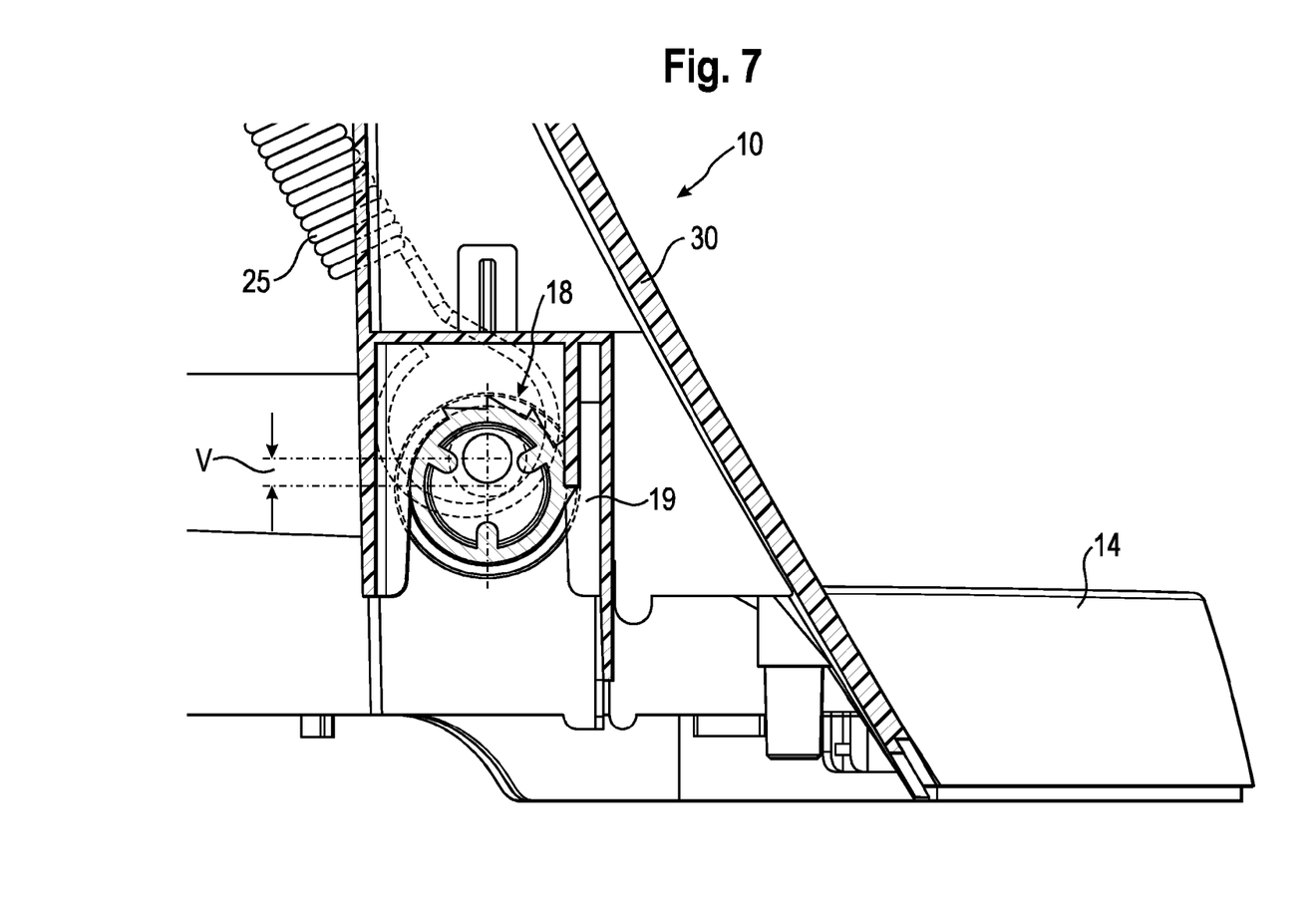
FIG. 7 shows a rearside view of the control element with reference to FIG. 5; and finally

FIG. 7 shows a rearside view of the control element with reference to FIG. 5. As mentioned above, the shaft 27 has an offset relative to the main rotation axis D of the control element 12. The rotation of the control element 12 can thus cause the engagement shaft 27 to be offset translationally, which pretensions or detensions the spring 25. According to FIG. 7 a clockwise rotation of the control element 12 would correspond to pretensioning of the spring 25. The ratchet means 19 is only shown schematically here and interacts with the gearwheel region 18 to hold the control element in a locked position. According to this embodiment the control element can undergo a full rotation so that a plurality of incident angles W can be achieved.

Figure 8:
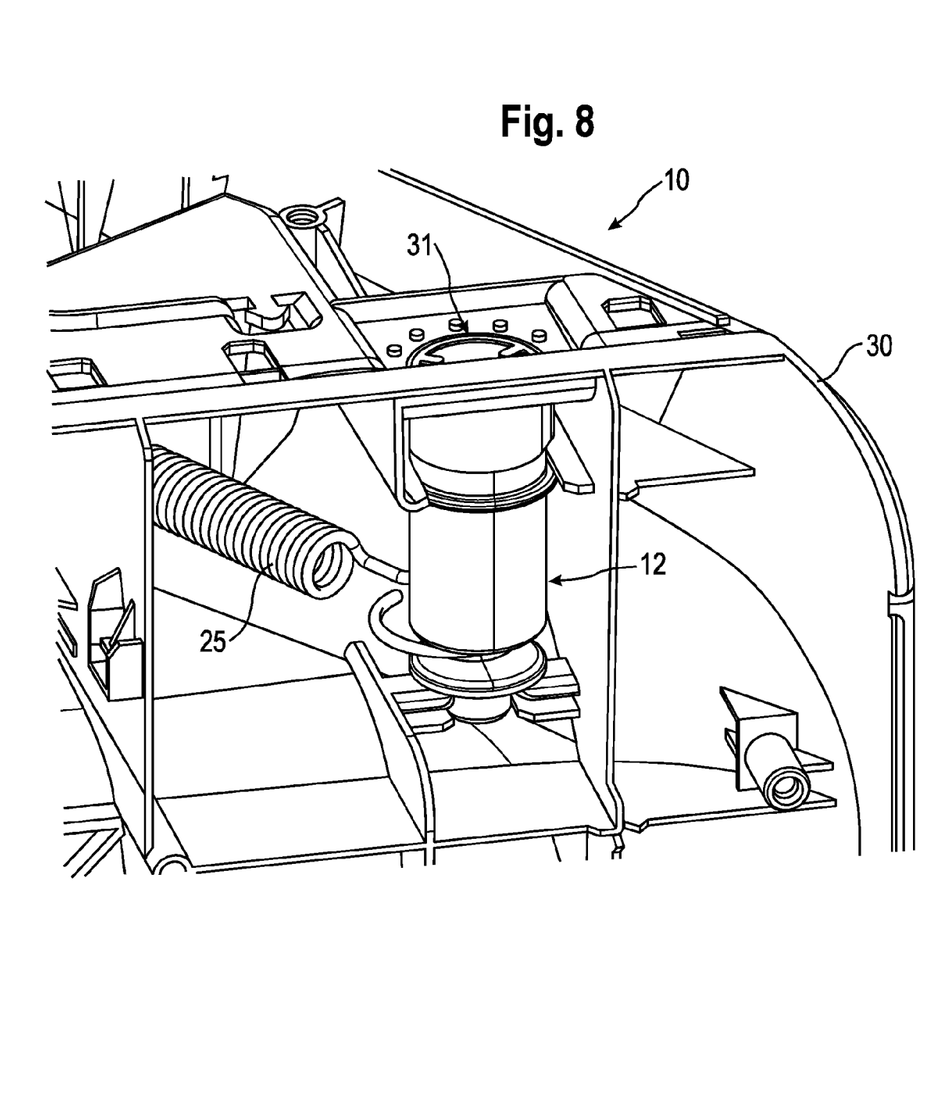
FIG. 8 shows a perspective view of the bottom of the inventive kitchen appliance.

Finally FIG. 8 shows a perspective view of the bottom of the inventive kitchen appliance. The housing 30 of the kitchen appliance 1 can be made of plastic for example, in which suitable accommodation means for the control element 12 have been provided during an injection molding procedure. The control element 12 can also be made as a single piece from a reinforced material, in order to be able to counteract the spring tension. The control element 12 can thus be inserted easily into the appropriate accommodation means of the housing 30 of the base body 10. The control element 12 is supported completely within the housing, so that the exterior of the kitchen appliance 1 still has a pleasing appearance for the end user, in other words the control element cannot be seen from the outside when the kitchen appliance 1 is finally assembled. In order to operate the control element 12, a tool is inserted at the tool interface 31 for example, in order to transfer a torque to the control element 12.

A method for setting a pivoting movement of a kitchen appliance pivot arm 11 supported in a pivotable manner on a kitchen appliance base body 10 is also proposed. This method can be performed automatically during final assembly of the kitchen appliance 1. To this end the pivoting movement of the pivot arm 11 is detected by measuring means and an appropriate spring pretensioning is set based on this behavior. This is necessary, as component tolerances can result in different behavior for identically structured kitchen appliances. A tool can then actuate the tool interface 31 in an automated process based on the measured parameters, in order to rotate or set the control element to a corresponding position.

The invention claimed is:

1. A kitchen appliance, comprising:
a base body;
a pivot arm disposed in a pivotable manner on the base body;
a lever facility for assisting a pivoting movement of the pivot arm; and
an adjusting mechanism operably connected to the lever facility to set a degree of assistance for the pivoting movement, the adjusting mechanism including a control element rotatably supported on the base body, and the adjusting mechanism including a ratchet, the control element having at least one gearwheel region interacting with the ratchet.

2. The kitchen appliance of claim 1, wherein the control element is supported on the base body for rotation about a rotation axis.

3. The kitchen appliance of claim 1, wherein the control element is supported on the base body for rotation about a rotation axis such as to allow a full rotation about the rotation axis.

4. The kitchen appliance of claim 1, wherein the base body has a housing, within which the control element is disposed.

5. The kitchen appliance of claim 1, wherein the lever facility has a force-active member interacting with the control element in an engagement region thereof.

6. The kitchen appliance of claim 5, wherein the force-active member is an elastic spring.

7. The kitchen appliance of claim 5, wherein the engagement region of the control element has an offset relative to a rotation axis of the control element.

8. The kitchen appliance of claim 7, wherein the engagement region of the control element is configured as an engagement shaft, which is offset from a main shaft of the control element running along a rotation axis by the offset.

9. The kitchen appliance of claim 1, wherein the control element is formed as a single piece.

10. The kitchen appliance of claim 1, wherein the control element is made of a reinforced material.

11. The kitchen appliance of claim 10, wherein the reinforced material is reinforced with glass fibers.

12. A method, comprising:
detecting a pivot behavior of a pivot arm supported on a base body of a kitchen appliance for executing a pivoting movement;
using a lever facility for assisting a pivoting movement of the pivot arm; and
setting the pivoting movement of the pivot arm using an adjusting mechanism operably connected by the lever facility to the pivot arm, the adjusting mechanism including a control element rotatably supported on the base body, and the adjusting mechanism including a ratchet, the control element having at least one gearwheel region interacting with the ratchet.

13. The method of claim 12, wherein the pivoting behavior is detected by measuring the pivoting movement.

14. The method of claim 12, wherein the pivoting behavior is detected by measuring a pivot speed.

15. The method of claim 12, performed in an automated manner on an assembly line during final assembly of a kitchen appliance or by an assembly operator.

* * * * *